(No Model.) 9 Sheets—Sheet 3.

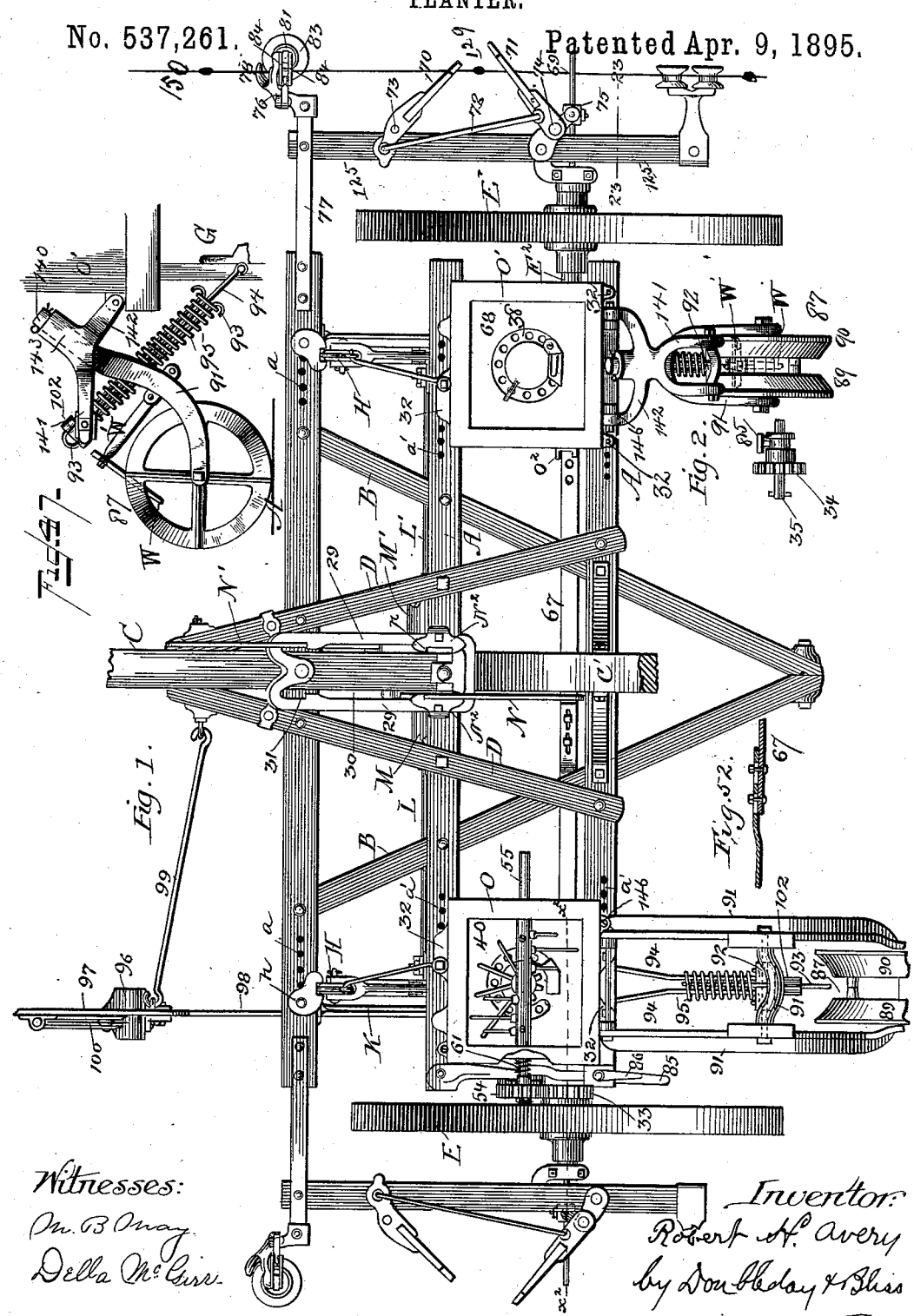

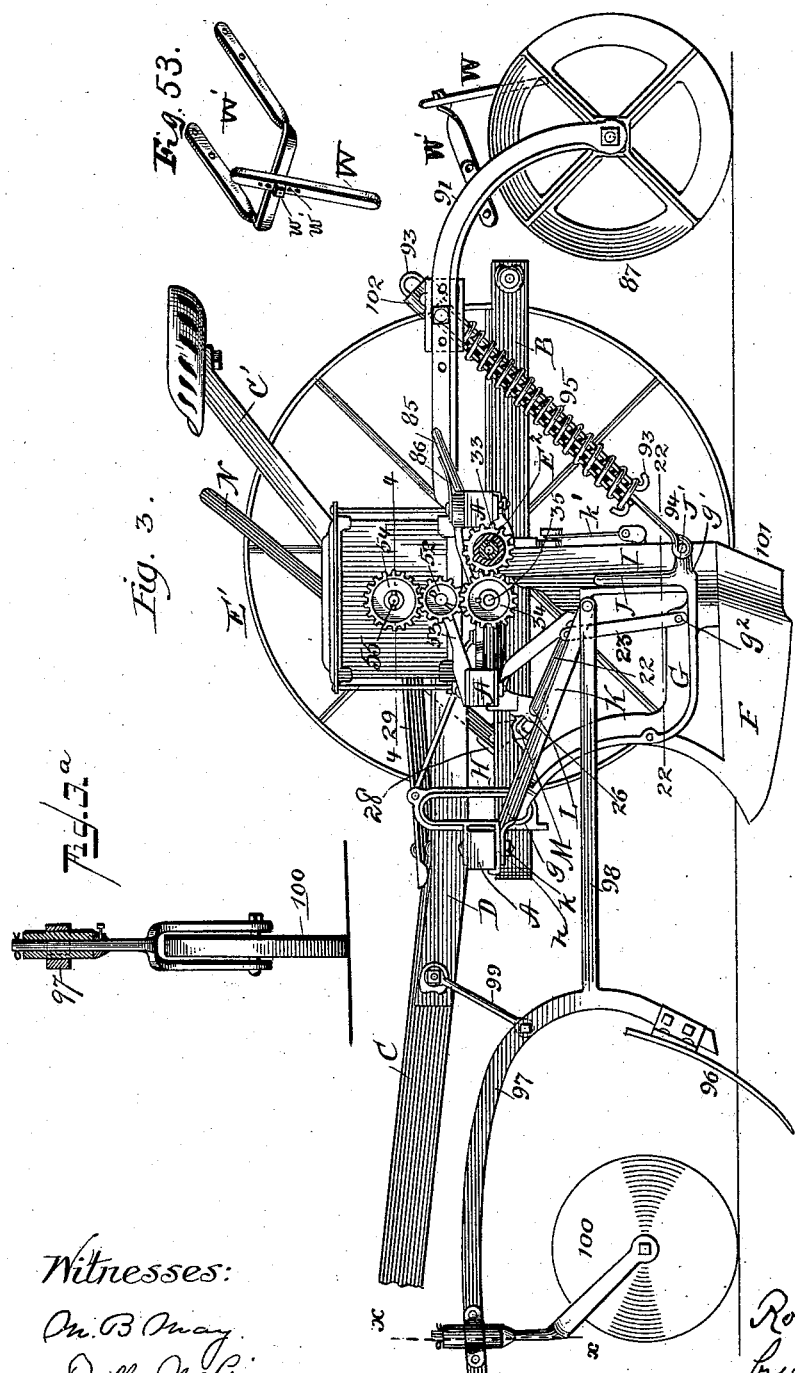

R. H. AVERY, Dec'd.
F. R. AVERY, Administrator.
PLANTER.

No. 537,261. Patented Apr. 9, 1895.

Witnesses:
M. B. May
Della McGurr

Inventor:
Robert H. Avery
By Doubleday & Blise
attys (No Model.) 9 Sheets—Sheet 4.
R. H. AVERY, Dec'd.
F. R. AVERY, Administrator.
PLANTER.
No. 537,261. Patented Apr. 9, 1895.
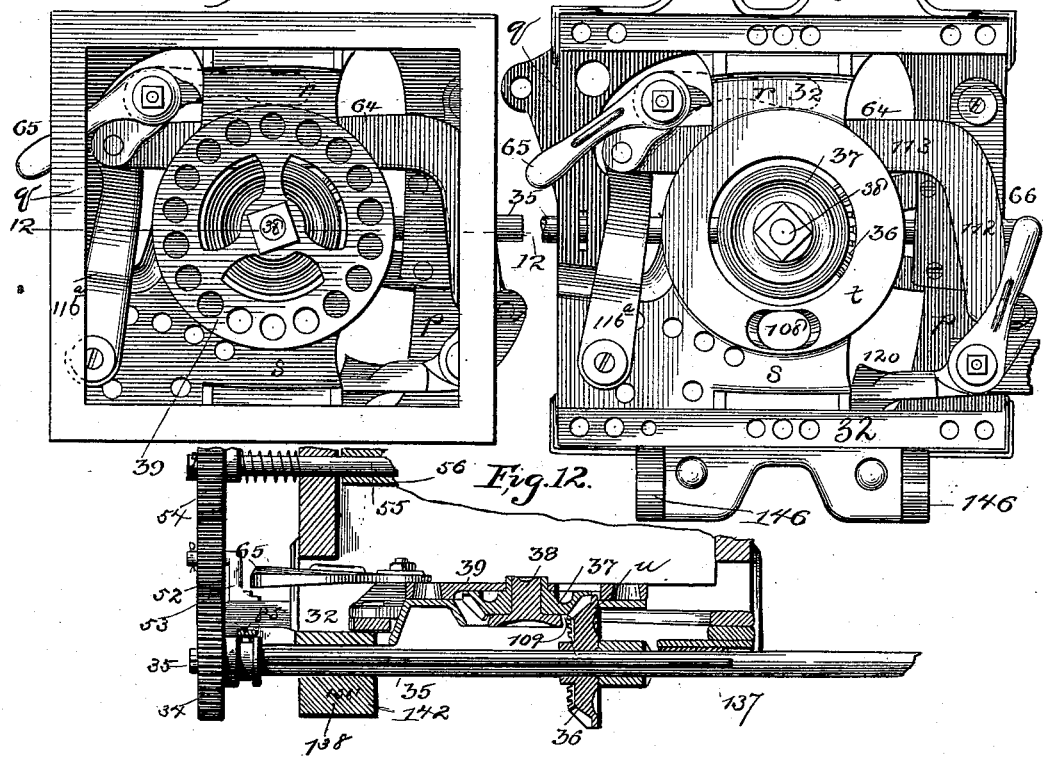
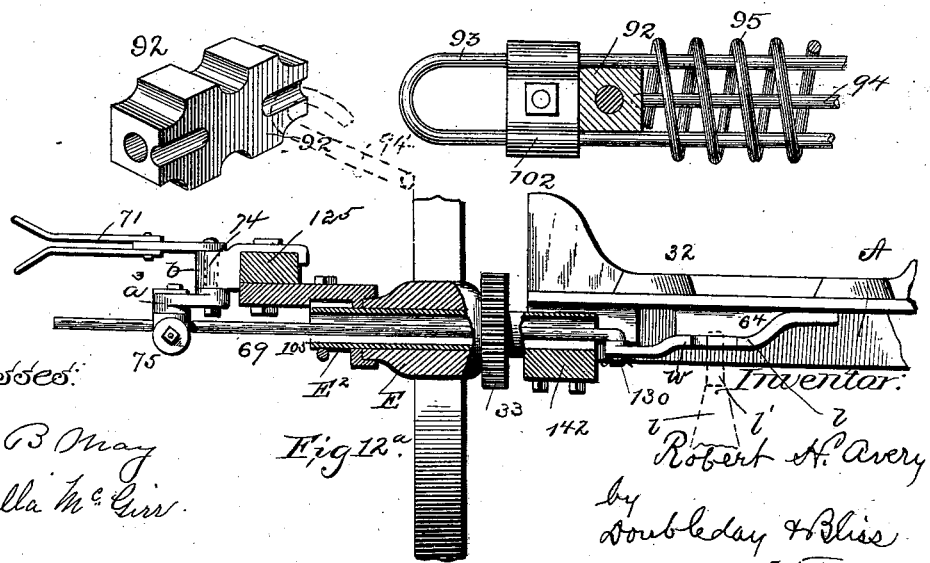

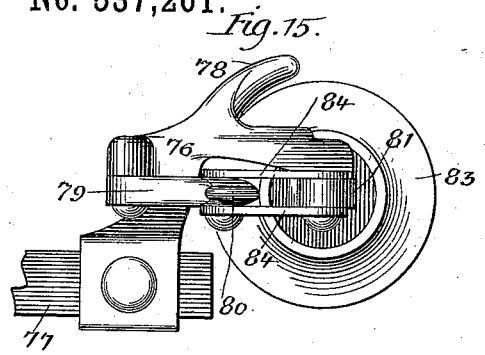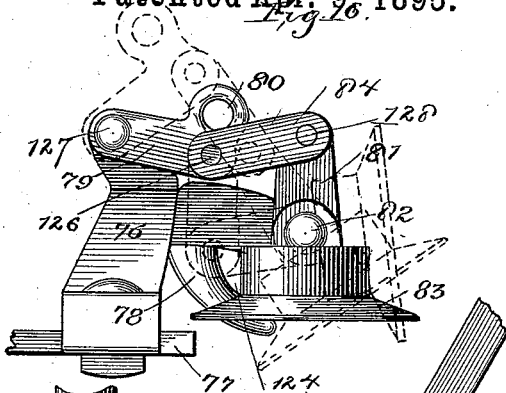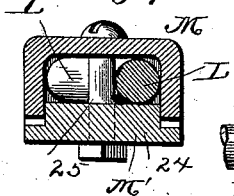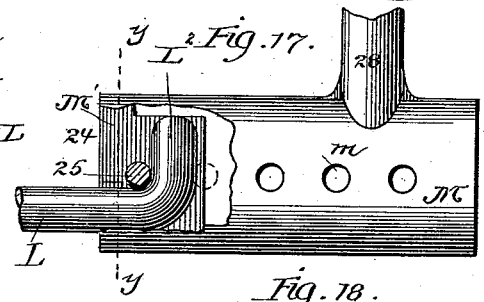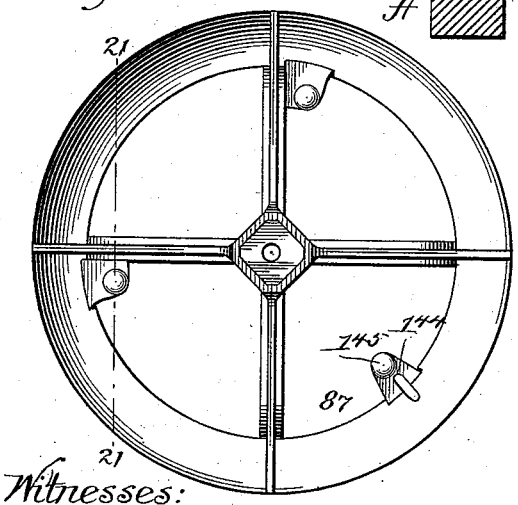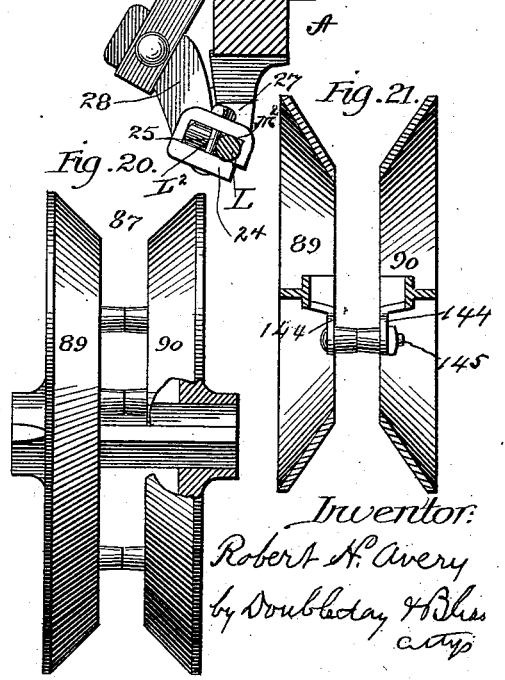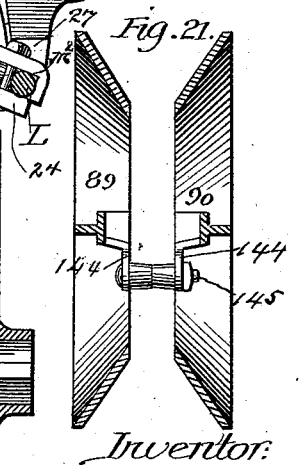

(No Model.)  9 Sheets—Sheet 6.
R. H. AVERY, Dec'd.
F. R. AVERY, Administrator.
PLANTER.
No. 537,261. Patented Apr. 9, 1895.
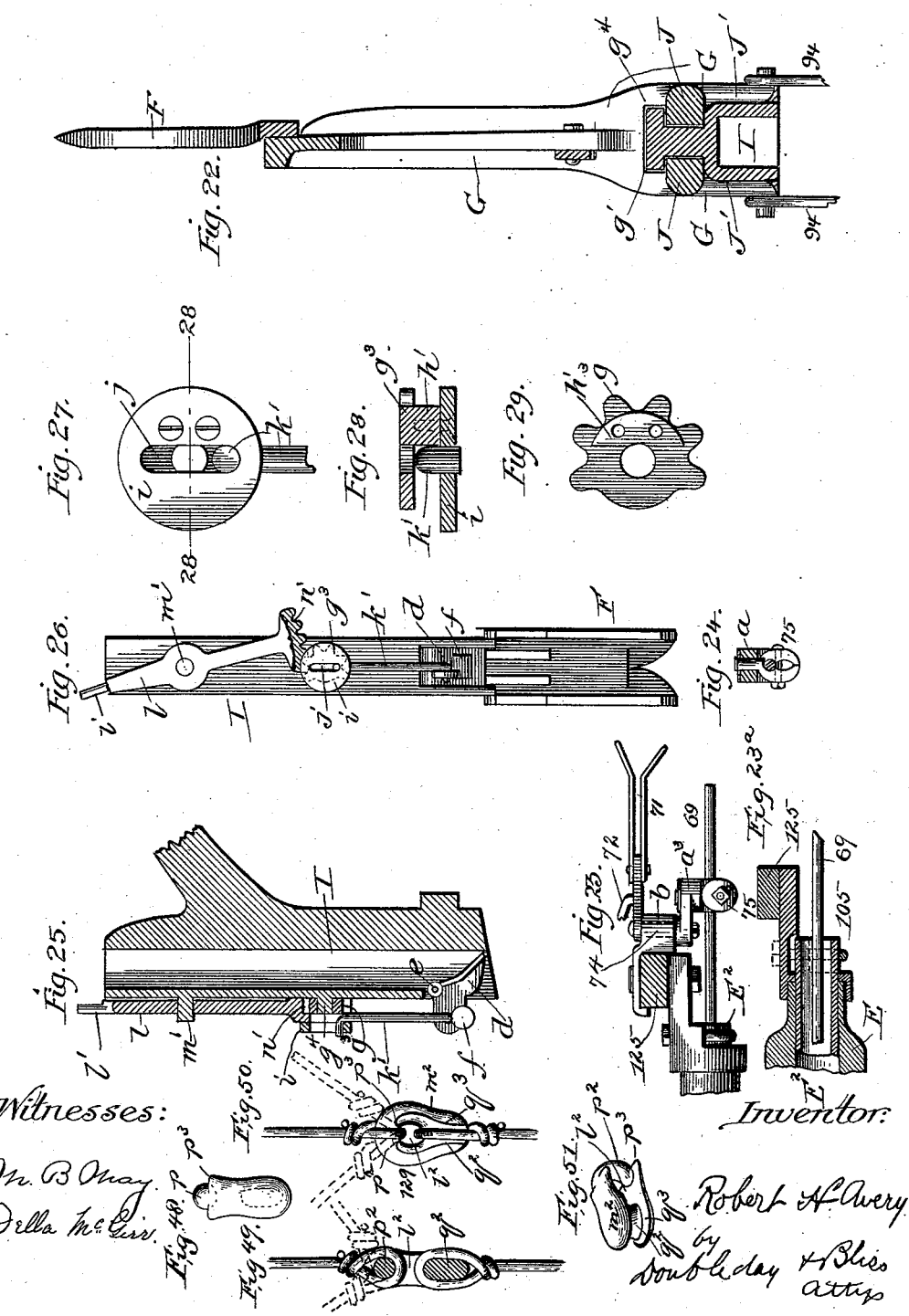

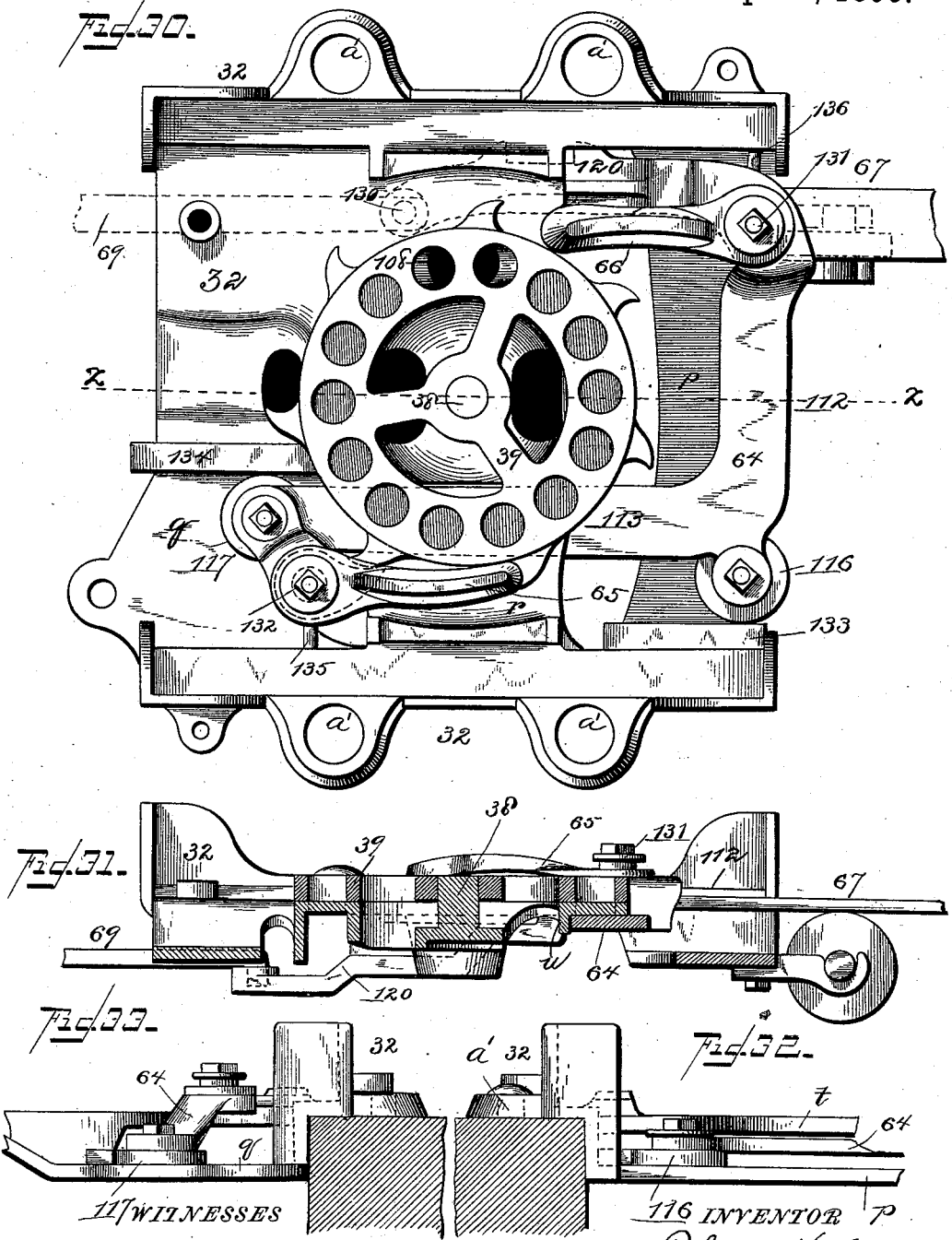

(No Model.) 9 Sheets—Sheet 8.
R. H. AVERY, Dec'd.
F. R. AVERY, Administrator.
PLANTER.
No. 537,261. Patented Apr. 9, 1895.
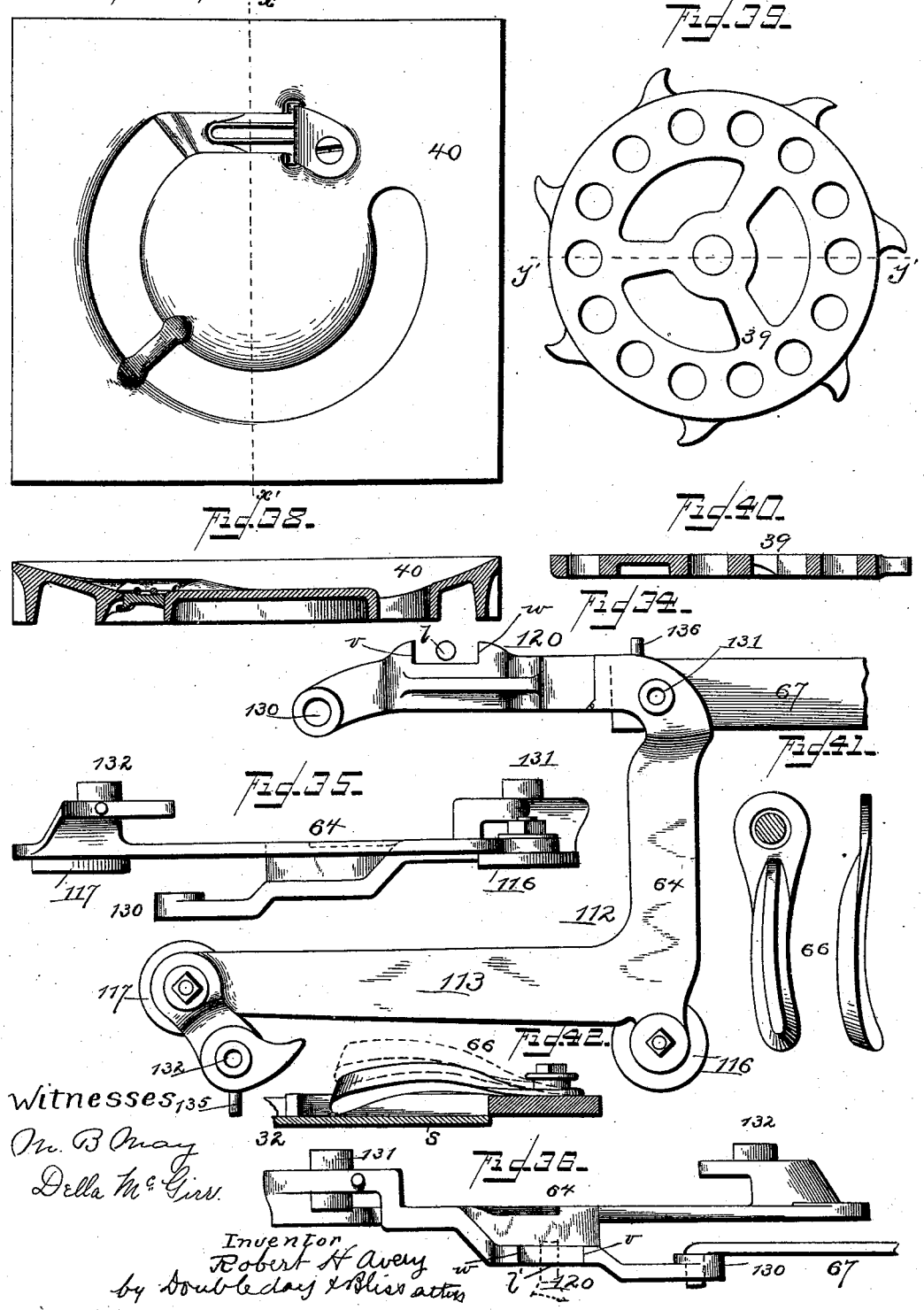

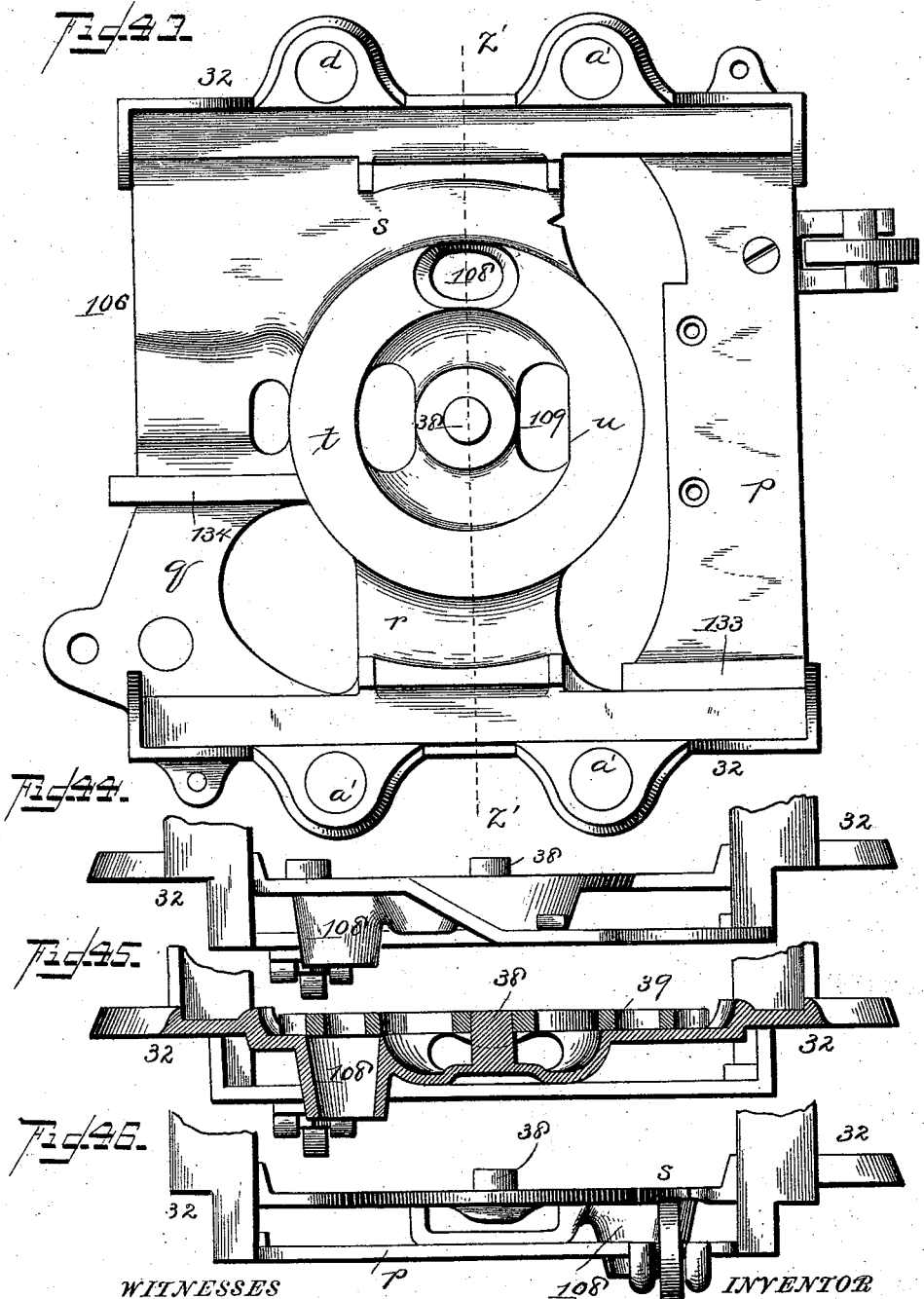

UNITED STATES PATENT OFFICE.

ROBERT H. AVERY, OF PEORIA, ILLINOIS; FREDERIC R. AVERY ADMINISTRATOR OF SAID ROBERT H. AVERY, DECEASED.

PLANTER.

SPECIFICATION forming part of Letters Patent No. 537,261, dated April 9, 1895.

Application filed April 23, 1890. Serial No. 349,135. (No model.)

*To all whom it may concern:*

Be it known that I, ROBERT H. AVERY, a citizen of the United States, residing at Peoria, in the county of Peoria and State of Illinois, have invented certain new and useful Improvements in Planters, of which the following is a specification, reference being had therein to the accompanying drawings.

Figure 6:
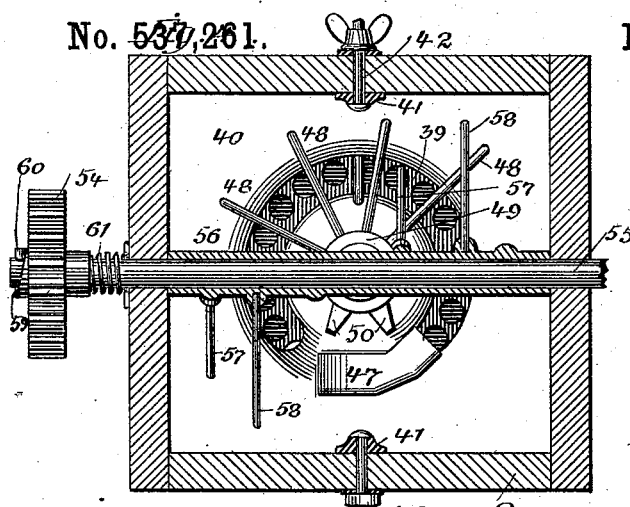
Figure 5:
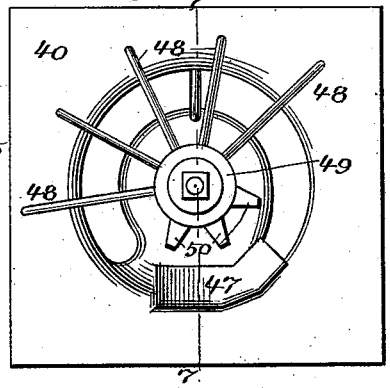
Figure 7:
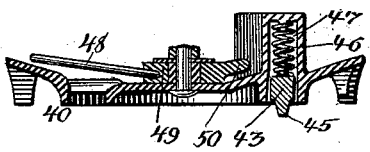
Figure 8:
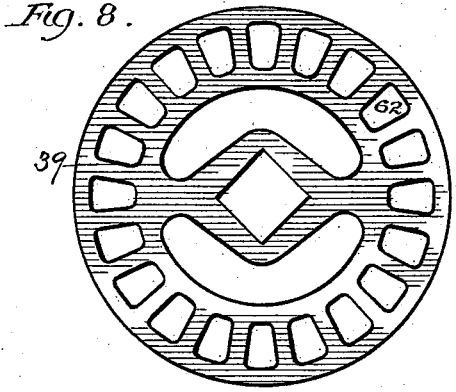
Figure 9:
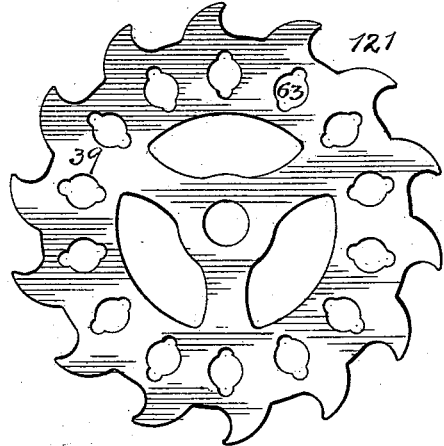

Figure 1 is a plan view of a machine embodying my improvements. Fig. 2 is a detail showing the wheel 34 and lever for moving it. Fig. 3 is a side view one wheel being removed. Fig. 3$^a$ is a section on line $x$—$x$ Fig. 3. Fig. 4 is a horizontal section through one of the seed boxes at line 4—4 of Fig. 3. Fig. 5 is a plan of the bottom plate in the seed box, and the horizontal agitators. Fig. 6 is a bottom view of this plate. Fig. 7 is a section at line 7—7 of Fig. 5. Fig. 8 is a plan of a cotton dropping plate. Fig. 9 is a plan of a dropping plate for check-rowing. Fig. 10 is a plan of a dropper mechanism the hopper bottom being removed. Fig. 11 shows the same except that the dropping disk is removed. Fig. 12 is a section at line 12—12 of Fig. 10. Fig. 12$^a$ is a section at line $x^2$—$x^2$ Fig. 1. Fig. 13 shows the stop block for the spring frame. Fig. 14 shows a portion of the spring and other parts which adjust the pressure of the covering wheel. Fig. 15 is a plan of the wire guide, or holder. Fig. 16 is a side view of the said guide, or holder. Fig. 17 shows the device for attaching the lever which lifts the runners. Fig. 17$^a$ is a cross section on the line $y$—$y$ of Fig. 17. Fig. 18 shows part of the frame, the tongue and the devices for lifting the runners. Figs. 19 and 20 are respectively a side and top view of a covering wheel. Fig. 21 is a section at line 21—21 of Fig. 19. Fig. 22 is a section on line 22—22 of Fig. 3. Fig. 23 is a section on line 23—23 of Fig. 1. Fig. 23$^a$ is a partial vertical section of parts shown in Fig. 23. Fig. 24 shows the clamp which joins the check-row devices with the shake bar. Fig. 25 is a partial vertical section through the seed tube. Fig. 26 is a rear elevation of the runner, the seed tube and parts attached. Figs. 27, 28 and 29 are details enlarged of parts shown in Fig. 26. Fig. 30 is a plan view of one form of seed dropper, or delivering device. Fig. 31 is a section on the line $z$—$z$ Fig. 30. Fig. 32 is a partial edge view of a right hand lower corner of Fig. 30. Fig. 33 is a similar view of the parts in the lower left hand corner of Fig. 30. Fig. 34 is a top plan view of the preferred pawl carrier. Fig. 35 is a side view of the same. Fig. 36 is a view from the opposite side. Fig. 37 is a plan view of a modified bottom plate for the hopper. Fig. 38 is a section on the line $x'$—$x'$ Fig. 37. Fig. 39 shows another form of the dropper wheel. Fig. 40 is a section on line $y'$—$y'$ Fig. 39. Fig. 41 is a top view and an edge view of a pawl. Fig. 42 shows the pawl in place. Fig. 43 is a plan view of the bed plate, or base plate of the seed dropper. Fig. 44 is a side elevation looking from the left in Fig. 43. Fig. 45 is a section on line $z'$—$z'$ Fig. 43. Fig. 46 is a side view looking from the right in Fig. 43. Fig. 47 (Sheet 1) shows in side view, the covering wheel and its support at the right hand end of Fig. 1. Figs. 48, 49, 50, and 51 (Sheet 6) show the ball knot or joint for the check row wire and the manner of attaching it. Fig. 52 (sheet 1) is a plan view showing the connections of the parts from one check rower to the other. Fig. 53 (Sheet 2) is a perspective of the scraper of the covering wheel.

The main frame of the machine comprises the transverse bars A, A, A, the forwardly diverging inclined bars B, B under those at A and the forwardly converging brace bars D, D above those at A. This frame can be varied as circumstances require. To it are secured the tongue C and the bar C' which support the driver's seat.

E, E', are ground wheels supported as shown on hollow axles E$^2$ which are secured to the main frame.

F is a runner or furrow-opener which is secured to, or made with a casting G loosely connected at both ends with the machine so that the runner can be raised and lowered in parallelism. The upper and forward end of this casting G is provided with a roller $g$ which is located in a slotted bracket H secured at $h$ to the frame, and the rear end of the casting G is forked at $g'$, $g'$, with the ends of the fork lying by the side of the seed tube I. (See Figs. 3 and 22.)

J, J, are guides projecting upward from the casting G and located in grooves provided in an extension on the forward side of the seed tube.

J', J' are extensions of the casting G for attaching the springs.

K is a brace, one end of which is connected with the frame at $k$ and the other end is secured to the seed-tube-casting.

L is a rock-shaft (see Figs. 1, 3, 17, 17$^a$, and 18) the outer end of which is provided with a bent or crank arm 22 pivoted to the upper end of a link 23. The lower end of the link is pivoted to the casting G at $g^2$. The other end, L$^2$, of this rock-shaft is bent as shown in Fig. 17 and is inserted in a casting M where it is held by a pin or bolt 25. (See Figs. 17, and 17$^a$.) This rock-shaft L is supported in bearings 26 and 27 which are secured to the frame, Figs. 3 and 18.

28 is an arm on the casting M to which arm a lever N is secured.

29 is a casting or guide frame bolted to the tongue and frame bar C'. (See Figs. 1, 3, and 18.) The central portion of this casting is open or cut away and between one side of this casting and the tongue there is an open space or guide-way 30 for the lever N.

31 is a notch to hold the lever N in its forward position.

N$^2$ is an adjustable holder with a notch $n$ adapted to be clamped to the casting 29. The notch $n$ receives the lever in its rear position.

The driver, by means of the lever N can rock the coupling M and shaft L and thereby through link 23 raise or lower the runner F and when raised out of the ground it can be held in that position by engaging the lever N with the notch 31.

The guide H, its fastening bracket at $h$, the runner, and the parts connected therewith, can be adjusted in and out along the frame bars A, A, there being a series of apertures at $a$, $a'$, through each of the bars. To allow for such adjustment, the connection at M, between the lever N and the rock-shaft L, can be fastened at one or the other of several places, there being a series of apertures $m$, $m$, to receive the bolt 25.

24 is a movable block which lies against the under side of part M, and bolt 25 engages with it.

From the above it will be seen that each runner is provided with two slide guides, one being near the rear end and on lines adjacent to the seed passage, and the other being near the front end, and the two guides being in parallelism, so that the runner can be lifted and depressed in such a way as to maintain substantially the same position as to horizontal lines, or as to the seed passage. It will also be seen that I apply the lifting mechanism to the runners at points between these front and rear slide guides so that the weight shall be balanced, the points of connection being nearer the heel ends of the runners so that the heavier parts can be moved without cramping or binding. Heretofore the vertical adjustment of the runners, even where the attempt was made to maintain them in parallelism, has been accomplished by a number of levers and links making the machine complex and with an undesirable number of parts. In the present case a single link in combination with the two slide guides is all that is required.

It will be understood that there are on each side of the machine a set of parts corresponding with those above described; that is to say, a lifting lever, a rock-shaft, a runner and adjuncts; N', L', and M' representing some of the same.

For the purpose of limiting the drawings I have shown in Fig. 1 two arrangements of the seed delivering devices, that at the left having the parts attached for drilling and agitating, and that on the right for check rowing, having some of the parts removed; but it will be understood that the machines, as actually made, are or can be provided with similar parts at both sides, which parts include or can include, those for planting corn, and those for planting cotton, first, by hand; second, by drill mechanism, and, third, by check-row mechanism and devices adapted for planting sugar cane and other seeds.

I will first describe the parts ordinarily used in planting such seed as corn.

O, O' are the seed boxes or hoppers, supported on the frame by castings 32 bolted at $a'$, $a'$.

The casting 32 forms the bed plate or base plate. It has elevated parts $r$, $s$ and $t$, and depressed parts $p$ and $q$. (See Figs. 10, 11, 30 and 43 to 46.) On the part $t$ the dropper disk or plate 39 is supported, there being a shaft or pintle for it at 38. This bed plate also has a seed tube 108, an aperture at 109 with a square wall $u$, for the purpose to be described.

A sliding pawl carrier is shown at 64, see Figs. 10, 11, 30, 31, 34, 35 and 36, it having pawls 65 and 66 pivoted to it. The ends of these pawls rest upon the aforesaid elevated parts $r$, $s$, of the bed plate, and are adapted to engage with the teeth of toothed seed wheels, or dropping disks. Two disks for this purpose are illustrated, one in Figs. 30, 31 and 39, and the other in Fig. 9. The former is adapted for intermittingly dropping by hand, and also check-rowing under some circumstances. The other in Fig. 9 is particularly adapted for check-rowing devices such as will be herein described, and has a peculiarly formed seed aperture 63. Each of these apertures has a wide central part and narrow ends, said ends being of the nature of notches communicating with the central part. These notches are adapted to receive the pointed ends of long kernels of corn.

The aperture can be made so that short or round kernels will pass through the central part of the hole, one at a time; and at the same time the long kernels will also pass through only one at a time, as the central part of the aperture will let the body of the kernel drop and the notch (one or the other) will permit the point to pass down. Thus I secure uniformity of delivery and regulate exactly the number of seeds which pass down in a given time, even though the seeds used be a mixture of long and short kernels. Heretofore there has not been, to my knowledge, a dropping disk devised by which the kernels could be accurately counted.

I am aware of the fact that disks with larger holes have been used for dropping at each delivery a larger number of seeds, interchangeably with disks, having smaller holes for dropping smaller numbers; but such disks by no means accurately regulate the delivery. There is now demand for planters which will deliver at each step one or two seeds.

With the ordinary circular holes, two small kernels can pass where but one large one can, and therefore the mere size of the holes cannot be depended on to accurately count the seeds. I accomplish this by providing a hole of such size that where it is desired to plant one kernel at a time, only one round or short kernel can enter it at the center, but so shape the aperture that, while being no wider, it is elongated so that a long kernel can pass into it.

If it is desired to plant two seeds at a time the central part of the aperture is made large enough to receive two short round ones, and it is elongated sufficiently to permit two long kernels to enter.

In Fig. 8, is shown a modified form of aperture 62 adapted for cotton seed it being oblong and tapering toward the inner end.

40 indicates the bottom plate of the seed receptacle or hopper, having a partial circular slot under which the apertures of the said disk 39 travel. It is held in place by the fastener at 41 and 42.

The dropping disks are actuated by the pawl carrier 64 (through the pawls 65, 66), that in the box O being connected to that in box O′ by a shake-bar 67, which can be made adjustable as in Figs. 1 and 52.

When the disks are to be actuated by hand, hand levers of the usual or any preferred construction are mounted upon the inner sides of the hoppers or boxes O, O′, and connected with the shake-bar 67, as at O².

The pawl carriers 64, joined as aforesaid by the shake-bar 67, may be of any suitable sort. I have devised one with certain novel features which I for some reasons prefer. It is formed with the parts 112, 113 and 120, that at 112 being on the inside of the axis of the dropping disk, that at 113 being on the front side, and that at 120 on the rear side thereof. The parts 112 and 113 rest upon the aforesaid depressed parts $p$ and $q$ of the base-plate, the bar 113 passing under the elevated part $r$ of said plate, and the bar 120 passing under the elevated part $s$ of said plate. The latter bar has an aperture at 130 for attaching an operating rod when check-rowing, and there is a recess with shoulders $v$, $w$, (see Fig. 34) for actuating the seed tube valve. The pawls 65 and 66 are pivoted at 131 and 132, there being such a looseness of attachment that the pawls can be lifted up at their free ends and turned around (see Figs. 10, 11, 12, 41 and 42), and the parts at the bottom of the hopper being shaped so that the pawls can be thrown out of their normal positions without striking any of said parts of the hopper. (See Figs. 10, 11 and 12.)

The shake-bar 67 is applied eccentrically to the sliding pawl carriers (see Figs. 1, 30 and 34); that is to say, the shake-bar is situated on a line away from the central transverse vertical plane of the seed box, so that shafting and other mechanism for drilling can be situated in said plane, as will be described below. The shake-bar being thus eccentric or tangential to the dropping disks, there is a cramping or binding of the slide or pawl carrier 64 at certain points in its movement. This I overcome by the construction shown in Figs. 30 to 35. I employ horizontally mounted anti-friction rollers 116 and 117. These can be arranged as desired. As shown, both are connected to the arm 113 of the slide 64. They bear one forward against a guide at 133 on the base plate 32 and the other rearward against a guide 134. When the slide 64 is thrust outward there is no cramping as the pawl is on a direct line with shake bar 67 but when it is thrust in the other direction the cramping is produced which is relieved by wheels 116 and 117. 135 and 136 (see Figs. 30 and 34) are steady pins secured to the slide which act to assist in holding it properly.

By examining Figs. 30, and 34, and others it will be seen that the slide, considered as a whole, extends from a line inside of the seed plate, that is, between the axis thereof and the center of the machine, to a line outside, and also extends from a line in front of the axis of the seed plate to a line in rear thereof; or in other words that the slide largely surrounds the axis of the seed plate; and it is because of this arrangement relative to this axis, that the anti-friction devices lend assistance in its movement.

In Figs. 10 and 11 links 116ª are shown instead of rollers but the rollers are superior for some reasons.

When the machine is to be used in check-rowing, I use the following devices or their equivalents in connection with those above described.

Referring to Figs. 1, 12ª, 23, and 23ª, 69 is a rod passing through the aforesaid hollow axle E² of the ground wheels and pivotally connected at 130 to said sliding pawl carrier 64. The outer end of this rod 69 is adjustably connected to the forked levers 70 and 71 which are operated by the check-row wire.

75 (see Figs. 23, 12ª, and 24) is a clamp adapted to be fastened wherever necessary to rod 69, and this clamp is pivoted to a crank arm $a^3$ carried by a short shaft 74 mounted in a bearing $b$. This bearing is secured to a bar 125 which is supported at the rear end on the wheel axle and at the front end on a bar 77 extending laterally out from one of the frame bars A. To the upper end of the short shaft 74, is secured the rear forked lever 71. The other forked lever 70 is pivotally secured to said bar 125 at a point 73 farther forward.

72 is a link connecting the forked levers 70 and 71, it being pivoted inside of the pivot 73 to lever 70 and outside the pivot 74 of lever 71; so that the levers are caused to move oppositely, that is, either their ends simultaneously approach, or simultaneously recede from each other. When they move, the bar 69 will be correspondingly moved in or out, and the pawl carrier 64 moved with it.

The movements of the forked levers 70 and 71 are caused by the check-row wire 150, which is held and guided at the front by the parts shown in Figs. 1, 15, and 16.

76 is a bracket adjustably secured to bar 77. See Figs. 1, 15, and 16. It extends up and out, and is provided with a downward and outward turned finger 78.

79 is a short bar pivoted to the upper end of bracket 76, and has an eye 80 for attaching a cord.

81 is a lever pivoted at 82 to bracket 76.

83 is a pulley journaled on lever 81. There are one or more (preferably two) links 84 pivoted to lever 81 and to the aforesaid bar 79. If bar 79 be lifted, the pulley 83 will be turned to one or the other of the positions shown in dotted lines, (Fig. 16) which lifting can be done by the operator's hand or by the cord attached to eye 80, which extends to and has its end fastened to the driver's seat or some other convenient point.

When the parts are in the normal position shown by full lines in Fig. 16, the check-row wire moves through the passage at 124 between pulley 83 and finger 78, and it cannot escape therefrom, as the pulley is locked in position, the pivot at 126 being below the pivots at 127 and 128; but when the parts are in the positions shown by the dotted lines in Fig. 16, the wire can drop away; and when the pulley 83 is in its uppermost position, it will remain there until purposely returned to that shown in full lines, Fig. 16.

When the machine reaches the end of the row, the operator by cord or hand throws the pulley out and releases the wire. Then after the wire has been re-introduced for the next row, the pulley can be readily dropped to hold it.

The parts just described and the forked levers 70 and 71 should be properly adjusted in relation to each other. Said parts 70 and 71 have certain peculiar features. As shown in Fig. 1, their outer ends are near each other, having been brought into this position by the action of the ball or knot 129 which operated on the fork 70. This ball or knot will next immediately catch upon the fork 71, moving it back toward the rear of the machine. This not only thrusts the rod 69, pawl carrier 64 and shake-bar 67 inward, but also throws the end of fork 70 toward the front, ready to receive and be acted upon by the next knot or ball. Ordinarily, when these parts are used, the pawls 65 66 are turned around on their pivots, as shown in full lines in Figs. 10 and 11, so as to be in the line of engagement with the toothed dropping disks. Under such arrangements, when the lever 70 is engaged by a ball or knot 129 on the rope and moves backward, the rod 69, shake-bar 67 and pawl carrier 64 will impart no motion to the dropping disks, but the valves in the seed tubes will be raised. Then when the ball moves lever 71 and the rod 69, shake-bar 67 and pawl carrier 64 are moved in the opposite direction, the pawls 66 (having been left in normal position) will engage with one of the teeth of the dropping disks and impart motion thereto, causing the delivery of seed—that is to say, when rod 69 and the shake-bar move in one direction, both of the seed disks or wheels will move; but when said rod and bar move in the opposite direction neither of the dropping disks will move. When the forward fork 70 is worked by the ball or knot the valve in the seed tube will be opened to drop the seed to the ground, the dropping disk at that time, remaining stationary; but when the rear fork 71 is acted on by the ball, the dropping disk will be moved and a charge of seed will be delivered to the valve.

The rear fork 71 is so connected to the shake-bar that it has its full throw, even if the adjustment of the bar is not entirely accurate, because the throw of the fork is only limited by that of the shake-bar.

I so arrange the parts, that is, the wire holder at 78—83, and the forked levers 70 and 71, and so connect the latter with the rod 69 that the pressure of the wire on the forks prevents the shake-bar from rebounding, such rebounding being a serious difficulty experienced in the use of planters as ordinarily constructed, unless special locking devices are added which entails extra expense.

I have confined the description mainly to the check-row devices on the right hand side of the machine in Fig. 1, but it will be understood that the devices shown at the left hand side of the machine in that figure are similarly arranged and operated.

When the dropping is to be effected by hand the check row devices remain in place and at such times both of the pawls on the pawl carrier can engage with their seed plate. In any case the dropping disk can have a tooth for every seed aperture as in Fig. 9, instead of having one for each alternate aperture as in Figs. 30 to 39.

Either one of the droppers can be thrown out of action independently of the other (as by turning the pawls, 65, 66 to an inactive position, disconnecting the shake bar 67, or otherwise), and if at any time it is discovered that a row, or a part thereof, has not been properly planted, one of the droppers can be stopped, and its runner or furrow opener can be elevated from the ground, after which the faultily planted row or part thereof can be replanted, and without danger of digging up the adjacent row.

The lifting mechanisms are independent of each other, and the runners correspondingly independently adjustable vertically.

I have above referred to a valve in the seed tube. A valve of any of the ordinary forms can be employed; but I prefer one having the features of improvement which I have herein shown, having more particular reference to Figs. 25 to 29 inclusive. The valve proper is indicated by $d$. It is pivoted at $e$ to the lower end of the seed tube I and is provided with a weight $f$ which tends to keep it closed.

$g^3$ is a mutilated gear-wheel pivoted on the seed tube, and it has a projection $h'$ to which is secured a circular plate $i$ having a slot $j$.

$k'$ is a rod connected at the lower end to valve $d$ and having its upper end fitted in the slot $j$ in plate $i$, it preferably passing up behind said plate $i$ and having its upper end bent outward to enter the slot. Preferably rod $k'$ carries weight $f$.

$l$ is a lever pivoted at $m'$ to the rear side of tube I, and it has a curved rack $n'$ engaging with the teeth on wheel $g^3$. The upper end $l'$ of the lever $l$ engages with the reciprocating pawl carrier 64, (see Figs. 12$^a$, 34 and 36,) the said end $l'$ being engaged by the shoulders $w$, $v$, on the part 120 of the said pawl carrier 64.

The teeth on wheel $g^3$ and rack $n'$ are of such number, and the throw of the lever $l$ is of such length, that about one-half of a revolution is imparted to wheel $g^3$ and plate $i$ at each movement of the lever. Figs. 25, 26, and 27 show the relative positions of rod $k'$ and plate $i$ at the end of one movement of lever $l$, rod $k'$ being at one end of slot $j$. Now when lever $l$ makes its next movement, it will throw plate $i$ one-half way around, and while moving around it will draw up the rod $k'$ far enough to open the valve $d$. At the end of the half revolution, the slot $j$ will be inverted, and rod $k'$ will instantly drop to the end opposite to that shown in Figs. 25, 26 and 27, the valve suddenly closing under the action of the weight.

The wheel $g^3$ is held in place on stud $g^4$ by a flange on the lower end of lever $l$ (see Fig. 25) which flange lies between wheel $g^3$ and plate $i$.

Having thus described the mechanism which can be used for planting intermittingly either by hand or by automatic check-row devices, I will now set forth the parts of the machine which can be brought into use when it is desired to drill; that is to say, to plant seed continuously. At such time, the dropping wheel or disk (shown in Fig. 39 or in Fig. 9) is removed, and, first, a bevel wheel 37 in Fig. 12 is inserted, it having a hub with a circular aperture to fit the pintle 38, the periphery of the hub being, however, square or angular in section. (See Fig. 11.) Then a dropping wheel or disk with a square aperture (see Figs. 8 and 10) is put in place, its aperture fitting the angular hub of wheel 37. This wheel 37 engages with a vertical bevel wheel 36 which is left permanently in place in the machine and which is mounted on a shaft 35 situated under the center of the hub or box. The shaft is mounted in a bearing at 137 and 138. On the outer end of the shaft there is a toothed wheel 34 adapted to engage with a wheel 33 secured to the hub of the ground wheel E.

85 is a clutch lever pivoted to the frame and engaging with the hub of wheel 34, the latter being splined to shaft 35 and adapted to be moved longitudinally thereon by lever 85.

86 (Fig. 3) is a spring lock which holds lever 85 in the one or the other of its two positions, and therefore keeps wheel 34 as desired either in or out of engagement with wheel 33. When in engagement therewith, the shaft 35 will be rotated, and with it the wheels 36 and 37, and therefore the dropping plate 39. The above mentioned aperture 109 in base plate 32 permits the bevel wheel 36 to project upward to engage with wheel 37, and the square wall at $u$ provides a suitable bearing for the back of this wheel 36.

It will be understood that in the machines as made, the right hand side of each is provided with devices similar to those just described, namely: with the wheels 33 and 34, 36 and 37, and with the shaft 35 and the shifting lever 85.

Instead of two independent driving mechanisms 33, 34, use may be made of a shaft, as at 35, long enough to extend from one seed box to the other and provided with two bevel wheels like that at 36; but for some purposes I prefer to have two sets of actuating devices interposed between the drive wheels and the seed plates.

The manner of operating these drilling devices will be readily understood.

The pawls 65, 66 on both sides of the machine are turned around as in Figs. 10 and 11, (full lines,) the pawl slide 64 and the shakebar 67, at this time being idle. The dropping disk 39 is placed upon the square hub 38 of wheel 37; and driving wheel 34 is shifted out into engagement with wheel 33. Thereupon (the machine being in motion) the dropping disks will be continuously rotated, delivering rapidly their charges of seeds to the tubes 108 and I.

When cotton or similar materials are to be planted, substantially the same parts are used as have just been described, but with the addition of others required by such seeds.

55 is a shaft (see Figs. 3, 4, and 12), adapted to be mounted across each of the seed hoppers, there being apertures through the outer and the inner walls for its reception. It is rotated by the aforesaid wheels 33 and 34, through the medium of a wheel 54 on its outer end, and an idler wheel 52 interposed between wheels 35, and 54. This shaft 55 carries a series of arms 57, 58, those at 58 being somewhat longer than those at 57. For convenience of insertion and detachment, these arms 57, 58 are carried by a sleeve 56 through which the shaft 55 can be passed, and to which it can be secured by means of set screws. The arms 57 58 are rotated vertically with the shaft 55 and act as stirrers to agitate the cotton seed and cause it to move downward toward the bottom. Then to cause still further agitation of the seed, I employ an oscillating agitator consisting of horizontally moving arms 48, 48 secured to a hub 49 which is journaled in the center of the bottom plate 40 of the hopper. These arms move above the curvilinear slot or opening in the bottom plate 40 which is above the apertures in the seed wheel. The oscillating motion is imparted to the agitators 48, 49 by means of the longer arms 58 carried by sleeve 56 on shaft 55, these arms being of such length that they can engage with one or another of the horizontal arms 48. As the arms 58 rotate, that at the left hand (see Fig. 4) first strikes one of those at 48 and moves the horizontal agitators to the right. Then at some time during the remainder of the revolution of shaft 55, the right hand arm 58 strikes one of the arms 48 and throws the horizontal agitator to the left. In this way a complete oscillation is given to the horizontal agitator at every revolution of the shaft 55.

To prevent backward rotation of the shaft 55, Fig. 4 I combine with it a backing ratchet for connecting it and its wheel 54, the same comprising the pin 60, the teeth at 59, and the spring 61.

While these devices for agitating the seed are in operation, the dropping disk is being simultaneously operated by the parts indicated by 35, 36 and 37, the same as when corn is being drilled.

The dropping disk for planting cotton seed may have circular apertures, as shown in Figs. 4, 10 and 12, or it may have oblong apertures as shown in Fig. 8, the latter being preferable for this seed.

When the machine is used for drilling corn or other seed, the above described adjustment of the seeding mechanism relatively to the ground wheels is still attainable. The shaft 35 is splined or grooved to permit the wheel 36 to be put in either of several positions, the wheel 34 remaining in its normal position as to wheel 33, subject to its clutch. The agitator mechanism, if in use, is similarly provided for, as the sleeve 56 permits the box to be moved in or out without requiring that wheel 34 shall be changed in its relation to the driving gear. The idler wheel 32 is carried by the arm 53 stationary on the frame.

In Figs. 4, 5, 6 and 7 I have shown the cut-off and discharge device or ejector which I have devised and which can be used to advantage in planting seed of any sort, particularly cotton seed. The object is to get a quick and assured passage of the seed from the apertures successively in the dropping plate.

47 (see Figs. 5 and 7) indicates a chamber whose walls are cast with the bottom plate 40. In the lower end of this chamber there is placed a discharger or ejector 43 formed of a piece of metal preferably somewhat pointed at the lower end, as at 45. It is prevented from escaping entirely from the chamber by means of pins or stops 44, (see Fig. 6) secured to said walls.

46 is a spring in chamber 47 bearing upward against the top thereof and downward against the discharge device 43. The projecting end 45 of the discharge device is adapted to enter the seed apertures in the dropping disk. As the seed disk revolves, the bars of metal between the apertures will successively throw the discharge device up against the spring, and as soon as the aperture has got fully beneath it said spring will force or snap it downward, and the point 45 will drive out the seed from the aperture, so that all sticking and clogging thereof are overcome.

By examining Figs. 17 and 6, it will be seen that there are supplemental to the snapping ejector, spring actuated cut off devices overhanging the seed plate for insuring that no seed shall be adjacent to the apertures to interfere with the proper action of the ejector, and to insure that no grain shall be broken either in passing under the cut off, or from the blow of the ejector.

The shaft 55 extends beyond the seed box toward the center of the machine so that said box can be adjusted, as above provided for (by changing the bolts in the apertures $a$ $a'$) and yet allow the wheel 54 to remain in line with the wheels 33, 34, and 52.

I have, in Fig. 1, shown the agitators and the parts which operate them as being applied only to one side of the machine, but it will be understood that the other seed box is also furnished with the same mechanism.

Means for covering the seed are required in whichever of the above several ways the seed is delivered to the ground. I have shown a covering wheel 87 and two ways of mounting and attaching it, one being illustrated at the left side of Fig. 1, and the other at the right side of Fig. 1 and in Fig. 47, the wheel itself being shown detached in Figs. 19, 20 and 21.

The wheel is made in two parts, the outer faces of the periphery of which are inclined or concaved and separated at their inner edges. The two parts 89 and 90 are connected together by inward extending projections 144 and bolts 145, there being studs between said projections, which studs can be longer or shorter so as to vary the distance between them as may be desired. A covering wheel of this form is very desirable. It forces down the earth at both sides of the seed and imparts sufficient pressure there to the earth, but as it is open at the center it does not press or compact the soil directly above the seed, and therefore the latter has a better opportunity to grow.

I will first describe the mounting for the covering wheels shown at the left of Figs. 1 and 3 in connection with Figs. 13 and 14.

91 is a frame or wheel carrier hinged to the main frame by ears 146 on base plate 32 and composed of two pieces or bars extending back and down from the hinges. 92, is a block between said bars 91 and held by a bolt.

93 is a bent wire which passes around the block 92.

94, 94 are two rods hinged at their lower ends to the above described heel extensions J' of the casting G. Their upper ends are bent over and enter grooves in the under side of block 92 (see Fig. 13), and when the runner F is raised the covering wheel will be raised by the rods 94.

95, is a coiled spring the lower end of which engages with hooks on the lower ends of the wire or rod 93, and its upper end is engaged by hooks at the upper ends of the rods 94. See Fig. 14. This spring allows the frame which carries the covering wheel to yield, but holds the covering wheel upon the ground with some pressure. On the bent wire 93, there is an adjustable clamp 102, (see Figs. 3 and 14) for the purpose of adjusting the tension of the spring 95. Thus I provide a connection between the runner and the covering wheel which is rigid when the former is elevated, but which is flexible as concerns the relative dropping of the wheel.

At the right hand of Fig. 1 and in Fig. 47 I have shown a form of mounting and attachment for the covering wheel which I prefer. In this case the wheel proper and the parts at 94, 95 and 102 are substantially similar to those above described, but in order to have the covering wheel swiveled or supported in the manner of a caster wheel, I form the frame 91, in such way as to have a pivotal or hinged portion at 140, and combine therewith a yoke frame having the arms 141 extending back, the arms 142 extending forward and down somewhat, and the hinged socket 143 extending upward. A block 92 and an adjustable stop 102 similar to those above described are connected to the arms 141 for the attachment of the spring. The arms 142 are pivoted to the frame. The socket part 143 receives the spindle part 140 of the covering wheel frame. The rods 94 are secured to the casting G in the way above described.

With this construction it will be seen that I not only get the same flexibility of motion as concerns movements around a horizontal axis, but also get flexibility around a vertical or substantially vertical axis, so that the caster wheel can more readily adapt itself to all of the motions of the machine.

In advance of the runner F there is placed a ground opening shovel 96. It is secured to a beam 97 which extends forward somewhat and carries a gage wheel 100. The beam 97 is supported by a brace rod 99 loosely connected to the frame and by the push rod 98 which extends backward and is pivoted to some fixed part of the machine. The object of this shovel is to open a furrow ready for the runner. The gage wheel 100 is adjustably mounted in a tubular holder (see Fig. 3$^a$) which can be clamped in any desired vertical position.

The heel of each runner is inclined, as shown at 101, which form is very desirable and aids in keeping the heel free from the accumulation of dirt.

In Figs. 48, 49, 50 and 51, I have shown the improved ball, knot or joint which I have devised for securing together the ends of the adjacent sections of wire used in check rowing. The object is, to provide better joining devices for the wire sections than those with which I have had experience, and at the same time have it adapted to act efficiently in tripping the levers of the check rowing. It is indicated as a whole by 129. At $l^2$ there is an aperture through it and through which the wires can be inserted when joining them. On one side of this aperture there is a relatively short neck at $q^2$, that is one of a length substantially equal to the thickness of the wire. This neck, in section, is elongated or angular as shown in Fig. 49 so that the eye of the wire which is fastened to it cannot turn around. At $q^3$ there are shoulders, projections, or stops which engage with the wire-eye and prevent it from oscillating relatively to the joint piece. On that side of the aperture opposite to the neck $q^2$ there is another indicated by $p^2$. The latter is longer, that is of a greater length than the thickness of the wire, so that the eye of the latter can oscillate, as shown in Fig. 49. It is less elongated in section than the other, preferably approximating a circle (see Fig. 50), so that it can oscillate in the other direction as shown. Stops or shoulders $p^3$ and $q^3$ are produced by making the parts $m^2$, $m^2$, intermediate of the necks thicker or wider throughout than the necks $p^2$, $q^2$. A ball or joint of this sort is of superior nature for while it allows all the necessary flexibility, it prevents the wire sections from kinking either on the reel or on the ground, and the wire passes smoothly to the check row levers no matter how it may be twisted, the ball or joint being of such character as to insure that the wire sections shall be in line when they reach the levers 70 and 71.

To understand the novel feature of construction and arrangement of the main parts of the machine, it will be remembered that heretofore planters of this class have been constructed on one or another of the following plans: Generally they have comprised two separate frames hinged together, one being the wheel frame, and the other a runner frame carrying the seed receptacles, the seed delivering devices, the furrow openers, &c., more or less. There are two sorts of these double frame machines to wit: first, those having the said frames joined by hinges at the rear of the front frame, and at the front edge of the rear frame; and, secondly, those having the frames arranged to more or less overlap, that is, having the hinge line somewhat in advance of the rear edge of the frame which carries the runners, the seed boxes, &c.; but in both cases the frames are to be regarded as distinct and separate, and the movements of the one at one time or another in the use of the machine depend upon the movements of the other.

Another class of planters include those of which each has a wheel frame, that is a frame mounted directly upon and vibrating about the axis of the ground wheels, and a separate frame for the boxes, seed delivering devices and runners, &c., the last said frame being arranged to slide vertically upon the wheel frame, and carry up and down the seed boxes, runners, check row devices, and all the planting parts.

There are serious disadvantages well known to be incident to planters of each of these classes, which I have overcome. I have practically but a single frame which is so mounted on the wheels as to be a wheel frame, that is one which is supported directly on the axle or axles of the wheels, and vibrates around the same, so as to carry the parts properly in relation to each other and to the ground notwithstanding the variation of the surface constantly met with. The boxes and the delivering mechanism are secured rigidly to this frame while the runners are vertically adjustable relatively to them. The check row devices are stationarily fastened to substantially the same frame as that which carries the seed delivering mechanism, and therefore they are always held in proper relation to it. In the earlier machine having the vertically sliding frames for the boxes, seed devices, the check row devices, were also arranged so as to be thrown up and down with the runners, and this I avoid.

As concerns the wheels and their means of mounting, it will be seen that the wheels are virtually open at the center, and that open wheels of other forms can be used. In the Patent No. 425,364 to L. B. Berrien, dated April 8, 1890, there are shown wheels which are open at the center, and also a planter frame, and a wheel frame somewhat different from that herein shown; but many of the features herein shown and described can be embodied in a machine of the sort therein illustrated, and, vice versa, more or less of the parts herein can be arranged as is therein provided for without departing from the spirit of the present invention. However I do not mean that all of the features of the present invention are dependent on the fact that the ground wheels are open at the center, for that is not the case, as many of them can be preserved even if use be made of the ordinary wheels, and solid spindles. Thus the wheel frame and a frame rigid therewith for the check row devices, can be used and so arranged as to carry the seed receptacles, and the seed delivering mechanisms in the transverse planes of the ground wheels, (as is herein provided for) without requiring the hollow spindles or centrally open wheels, although the wheels and spindles of those sorts are advantageous because of the convenient manner possible of connecting the check rowing devices and the delivering mechanism.

The spindles above described are virtually a part of the wheel frame, that is to say with the wheels there is combined a frame, when made as shown, which passes through the wheels and supports a part of the planter mechanism on the outside and a part of the same on the inside. The check row levers, or other parts could be supported on a solid spindle at points adjacent to the wheel and attain some of the ends aimed at; or the frame for the check row devices can be carried around the wheel, that is can be supported at the rear by a bar or equivalent secured to the main frame, the same as the present bar at the front.

The seed boxes in the present machine are adjustable toward and from the ground wheels notwithstanding the fact that the power transmitting devices are actuated by the said wheels.

I have above described the manner of using the machine, first, when planting intermittingly by hand; second, when planting intermittingly by check row devices; third, when planting continuously by the drilling devices, and, fourth, when planting such seed as cotton by the continuously rotating drill devices, in connection with the agitators, both vertical and horizontal; but it will be understood that the several parts constituting the machine, as a whole, can be arranged to operate in several other ways. Thus cotton, or other seed, can be delivered from the boxes, by means of the intermittingly acting dropping devices, including the pawls, the toothed dropping disk, the shake bar, &c., at which times the agitators will be also used. In such cases substantially the whole machine will be in operation, and the check row devices can be used or not as occasion dictates. Again, it will be seen that when the continuously rotating parts are used, (including the bevel wheels which actuate the dropper plate, and the agitating devices,) for the delivery of the seed to the tube, the reciprocating devices can be simultaneously used, either by hand or by the check row mechanism, for operating the valve in the seed tube. Therefore, I wish it understood that although a machine of this character presents parts which can be interchangeably used for several purposes, yet it is also one in which substantially all the parts can when desired be caused to coact; and it will be also understood that the agitating devices can be employed with corn or seed other than cotton as may be found necessary.

W represents the scraper for the covering wheel. The latter being made with two separated peripheral parts is liable to pick up and clog with mud or soft earth. This however I effectually remove by the scraper. As shown it consists of a bar or plate arranged to project inward from the outside of the wheel to a point inside of the outer edges of the two flaring or inwardly depressed peripheral parts, and when these parts are separated, as herein provided for, this scraper is carried to a point somewhat inside of the inner edges of the said peripheral parts. As a result of this arrangement all of the mud or earth which is inside of the inner edges is separated from that on the outside of the edges, that is, the part which is in the recess or cavity between the flaring surfaces, as well as that which may adhere to the outer sides of the periphery, and after being thus separated drops off, and that outside of said edges is pressed off by the wheel on the ground. As shown it is supported by a frame or carrier W' which is fastened to the frame or carrier that supports the wheel. When the covering wheel is mounted on a caster arm as in Figs. 1 and 47, this scraper is preferably carried by said caster arm so as to always be in proper relation to the wheel.

The scraper may be situated radially but it is much better to have it arranged tangentially in relation to the wheel, that is, on a tangent to a circle around the axis of the wheel.

The scraper proper is adjustable on its carrier, by means of a bolt $w$ and a slot or aperture $w'$.

I do not limit myself to having all of these details of construction and arrangement as for instance, projecting the scraper to a point inside of the peripheral rims, to making it in one piece, or to having it adjustable in the way described, &c., as there can be variations in these respects.

I claim—

1. In a corn planter, the combination of the two ground wheels, the frame supported thereon, the two seed carrying and delivering devices on said frame and situated between the front edges and the rear edges of said wheels, and adjustable toward and from them, seed tubes secured rigidly to and adjustable laterally with the seed carrying devices, and the runners adjustable horizontally with the tubes and seed devices and adjustable vertically independently thereof and of each other, substantially as set forth.

2. In a corn planter, the combination of the ground wheels, the frame mounted on said wheels, the seed boxes rigidly secured thereto, the seed tubes rigidly connected with the seed boxes, the runners or furrow openers adapted to move vertically independently of the seed tubes and boxes, and means on said frame for adjusting the runners vertically independently of the seed tubes and of each other, all of said parts being arranged substantially as set forth to be supported on the ground wheels.

3. The combination with the ground wheels, the frame supported thereon, the draft devices secured thereto, and the seed boxes, the seed delivering devices, and the check row mechanism all stationary on said frame, of two independent lifting devices for the runners, and means supplemental to the ground wheels for covering the seed, substantially as set forth.

4. The combination with the two ground wheels, the frame supported thereon, the seed box between the wheels, the seed tube stationary on the frame and formed with a stationary guide, of a runner fitted to said guide and vertically adjustable independently of the tube and seeding devices, and the seed covering device connected to the runner and adapted to be pushed up thereby, substantially as set forth.

5. The combination of the two wheels, the frame supported thereon, the tongue rigidly secured thereto, the seed carrying and delivering devices, secured to the frame, and the check row mechanism stationary relative to the frame and the seed delivering devices, and the runners vertically adjustable independently of the check row mechanism, substantially as set forth.

6. In a corn planter of the character described the combination with the main frame, the supporting wheels, the draft devices connected to the frame, and the two sets of planting devices, each having a seed box, a dropper adapted to be thrown out of action, a vertically adjustable runner or furrow opener, and a covering device, of the two independent lifting devices each connected to one of the said runners, whereby the latter can be independently adjusted, substantially as set forth.

7. In a check row planter, the combination with the two ground wheels, the frame thereon, and the two sets of planting devices on said frame, each having a seed receptacle an intermittingly acting dropper, a vertically adjustable runner or furrow opener, and covering devices, of the two independent lifting mechanisms, each connected with one of the runners, and the check row mechanism mounted on said frame, substantially as set forth.

8. In a planter, the combination of the two ground wheels, the frame supported thereon, the draft devices secured to the frame, the seeding mechanisms each having a vertically adjustable runner, and two slide guides for each runner, whereby it is held in parallelism in its several positions, with respect to the seed tube, substantially as set forth.

9. The combination of the two ground wheels, the frame supported thereon, the draft devices secured to the frame, the seeding devices on said frame, the seed tubes, the runners, each having a slide guide adjacent to the seed passage in the tube, and a supplemental slide guide in front thereof, the covering wheels behind the runners, means for connecting the runners to the covering wheels to elevate them, and the lifting mechanism connected to the runners at points adjacent to the rear slide guides aforesaid, substantially as set forth.

10. The combination with the main frame, the seeding mechanism thereon, and the vertically adjustable runner, of the vertical slide guide for the rear end of the runner, the vertical slide guide for the front end thereof, the lifting lever, and means connecting said lever to the runner at a point between the two slide guides, substantially as set forth.

11. The combination with the centrally open wheels, the planting mechanism, and the actuating devices for said mechanism, of the framework having a part thereof extending through the said wheels which supports the planting mechanism on the inside of said wheels, and the actuating devices on the outside, substantially as set forth.

12. In a planter, the combination of a ground wheel open at the center, a seed delivering mechanism, and devices independent of the wheel for actuating said seed delivering mechanism passing through said wheel, substantially as set forth.

13. The combination of the wheel open at the center, the seed carrying and delivering devices on one side of the wheel, a primary actuating mechanism on the other side of the wheel for actuating said seed delivering devices, and connecting devices passing through the wheel, substantially as set forth.

14. The combination with the ground wheel, of the seed receptacle and delivering mechanism on one side of said ground wheel, and the devices for actuating the delivering mechanism situated on the opposite side of the ground wheel and supported upon the axle or hub thereof, and means connecting the same to the said delivering mechanism and passing through said wheel, substantially as set forth.

15. The combination of the frame having a laterally projecting hollow spindle, the ground wheel mounted on said spindle, the planting mechanism on one side of the ground wheel, the check row devices on the other side of said wheel, and means passing through said hollow spindle for connecting the check row devices to the planting mechanism, substantially as set forth.

16. The combination with the frame, the planting mechanism, and the ground wheel, of a hollow axle or spindle $E^2$ for said wheel, the rod 69 in said spindle, the bar or frame 125, and the check row devices supported thereon and adjustably connected to rod 69, substantially as set forth.

17. The combination of the ground wheels, the wheel frame stationary relatively to the axis of the ground wheels, the tongue or draft frame rigidly secured thereto, the seed delivering devices, the runners movable vertically independently of the seeding devices, the reciprocating check row mechanism outside of the ground wheel and carried by a support which is rigid relatively to said wheel frame, and is between the front and the rear edges of the said wheels, substantially as set forth.

18. The combination of the wheels, the frame supported thereon stationarily relatively to the axis thereof, the seed boxes and delivering tubes supported rigidly on said wheel frame, the runners movable vertically independently of the seed boxes and delivering tubes, the check row devices on that side of the wheels opposite to the seed boxes and the delivering mechanism, and the support for said check row devices rigid with the frame which supports said boxes and located within the circumference of the wheels, substantially as set forth.

19. The combination of the open ground wheels, the seed receptacles, and seed delivering mechanisms situated between the front edges and the rear edges of the wheels, a connecting and power transmitting bar, as at 67, and the outwardly and oppositely projecting bars or rods connected to the said delivering mechanisms and extending through said wheels to points outside of the ground wheels, substantially as set forth.

20. The combination of the frame, the two laterally adjustable seed delivering mechanisms, the laterally reciprocating power transmitting means, as at 69, connected therewith, and the check row devices connected to the said parts 69 for reciprocating them, substantially as set forth.

21. In a corn planter, the combination with the dropping disk or plate, and the pawls, or equivalent, for engaging therewith to actuate it, of the slide connected to said pawls, and the horizontally revolving anti-friction wheels or rollers for said slide, as set forth.

22. The combination with the dropping disk or plate, and the pawls, or equivalent, for engaging therewith, of the slide for carrying said pawls, said slide extending from the inner to the outer side of the axis of the seed plate, and the horizontal anti-friction wheels or rollers, one inside of said axis, and one outside thereof, substantially as set forth.

23. The combination with the dropping disk or plate, and the pawls, or equivalent, engaging therewith, of the slide extending from the front to the rear of the axis of the seed plate and from the inner side to the outer side thereof, and the horizontally turning anti-friction wheels or rollers, supported on different axes, substantially as set forth.

24. A planter mechanism having a seed receptacle adapted to receive a rotating seed dropping disk or wheel, mechanism for imparting an intermitting rotary movement to a dropping disk, such as aforesaid, and mechanism driven by the ground wheel adapted to impart a continuous motion to a dropping disk or wheel, such as aforesaid, substantially as set forth.

25. A planter having a seed receptacle, and the base therefor provided with a support, as at $t$, for a rotary dropping disk or wheel, reciprocating pawls adjacent to said support for imparting intermitting rotary motion to a wheel or disk, such as aforesaid, a shaft, as at 35, on a line below said support and provided with a gear wheel, as at 36, adapted to continuously rotate a dropping disk, such as aforesaid, and means for continuously rotating said shaft, substantially as set forth.

26. The combination of the ground wheel, the seed delivering devices, and the independent seed agitating mechanism, both of which are adjustable toward and from said wheel, the gearing, or equivalent, stationary relatively to the wheel, and means for transmitting motion therefrom to the agitating and delivering devices, substantially as set forth.

27. The combination of the frame, the runner mounted thereon, and which is laterally and vertically adjustable, the relatively stationary lifting lever for said vertically adjustable runner, and the connecting devices for the lever adapted to be lengthened or shortened, substantially as set forth.

28. The combination with the frame, of the laterally adjustable runner which can be lifted relatively to the ground, the rock shaft connected therewith, and the lifting lever adapted to be connected to said rock shaft at one or another of several points, substantially as set forth.

29. The combination of the frame, the two laterally and vertically adjustable runners thereon, the separate rock shafts, L, L', connected to the said runners, the separate levers, N, N', and the adjustable connecting devices, as at M, 24, 25, substantially as set forth.

30. The combination with the vertically adjustable runners, and the levers, of the guide 29 having the adjustable catch, as at $N^2$, secured thereto, substantially as set forth.

31. In a planter, a covering wheel, in combination with a two-part carrier or support therefor, of which parts one is united by a horizontal pivot to the planting mechanism or frame and is hinged to the other by a vertical or inclined pivot, substantially as set forth.

32. A covering wheel formed in two separable sections, respectively having the peripheral parts, 89, 90, inclined to each other and with a central open space at their inner edges, and having the inward extending projections 144 to receive the joining devices, substantially as set forth.

33. A covering wheel having a hub or shaft attachment, a rim formed in two separated parts with inward extending projections joined together at points between the rim and the hub, substantially as set forth.

34. The combination with the runner or ground opener, and the gage device in front of the runner, of the beam or frame therefor projecting forward from the frame which carries the runner, and one or more lateral braces, as at 99, substantially as set forth.

35. In a wire-holder for a planter, the combination of a guide, as at 78, on one side vertically of the wire path, a guide, as at 83, on the other side, and below said path, and links, as at 79, 84, pivotally connected to the last said guide and to each other, substantially as set forth.

36. In a wire-holder for a planter, the combination with the casting having the downward and outward extending projection, 78, and an outward extending projection above it, of the movable guide 83, the lever 81, the links 79 and 84 pivoted to each other, and one pivoted to lever 81, and the other to said casting, substantially as set forth.

37. The combination with the seed tube, and the valve, of means substantially as described for opening the valve, and intermittingly detachable therefrom, and a weight or equivalent supplemental to the said means for closing it, substantially as set forth.

38. The combination with the seed tube, and the valve, of the vibrating lever $l$, and the longitudinally moving rod $k'$, for opening the valve, the rod being movable with lever and also independently thereof, substantially as set forth.

39. The combination with the seed tube, and its valve, of the rod or equivalent connected to the valve, the valve opening plate having two stops or points of engagement with said rod, and a weight for carrying said rod from one to the other of said points of engagement, substantially as set forth.

40. The combination with the valve for the seed passage, of the rotary slotted plate, connecting means between the valve and said plate, and engaging loosely with it in the slot, and the vibrating rack engaging with the rotary slotted plate, substantially as set forth.

41. The combination with the valve for the seed passage, of rod, $k'$, slotted plate, $i$, carrying teeth $g^3$, and rack $n'$ mounted upon a pivot, substantially as set forth.

42. The combination with the feed box or seed receptacle, and the continuously rotating seed plate therein, of the horizontally moving agitator arms mounted independent of the said plate, and the means for actuating said arms, substantially as set forth.

43. The combination with the feed box or seed receptacle, of the rotating seed plate therein, the agitator having a hub rotating on the axis of the seed plate, but independently thereof, and a series of horizontally moving arms projecting therefrom, and means for actuating said hub and arms, substantially as set forth.

44. The combination with the box or seed receptacle, and the horizontally rotating delivering or dropping plate at the bottom thereof, of the agitator mounted at the axis of the said dropping plate and movable horizontally around said axis and independently of the plate, substantially as set forth.

45. In a planter seed box or receptacle, the combination with the rotatory seed plate, and the horizontally oscillating arms, of the vertically rotating agitator arms above them, substantially as set forth.

46. The combination with the rotatory seed plate, and the agitator moving independently thereof, and having stirring arms, of the upper agitator having stirring arms, which directly engage with and move the arms of the lower agitator, substantially as set forth.

47. The combination with the lower agitator, of the upper agitator having projections which alternately engage with the lower agitator to impart successive opposite movements thereto, substantially as set forth.

48. The combination with the agitator adapted to move back and forth, of the continuously rotating agitator which engages at one part of its revolution with the aforesaid agitator to move it in one direction, and engages with it during another part of its revolution to move it in the opposite direction, substantially as set forth.

49. The combination with two adjacent sections of check row wire each having an eye, of the herein described joining device secured substantially rigidly to one of said eyes and having the articulating bar $p^2$ for the other eye, and stops or shoulders to limit the movement of the last said eye, substantially as set forth.

50. A ball or joint for a check row wire, it having the aperture $l^2$, the side parts $m^2$, the short grooved neck $q^2$, and the longer neck $p^2$, narrower than the side parts $m^2$, substantially as set forth.

51. A centrally open ball or joining device for a check row wire having the shoulders or stops $q^3$ on one side of the aperture at a distance apart substantially equal to the thickness of the wire, and the shoulders or stops $p^3$ on the opposite side of the aperture and at a greater distance apart than that aforesaid, to permit flexibility, substantially as set forth.

52. The combination with the reciprocating slides in the planting mechanism, of the horizontally vibrating fork levers, the means for connecting said levers with said slides, and the wire guides arranged substantially as set forth, whereby the pressure of the wire on said levers prevents the reciprocating parts from rebounding, substantially as set forth.

53. In a planter, a runner or furrow opener having its heel shortened on the bottom, and its rear edge inclined forward and downward, substantially as set forth.

54. In a planter, the combination with the main frame, the seeding devices, the supplemental frame for the covering wheel hinged to the main frame and movable independently thereof, and the covering wheel supported in said supplemental frame and formed with two separated peripheral parts having an inwardly opening passage way between them, of the scraper carrier secured to the said supplemental wheel support, and the adjustable scraper passing through the said passage way and situated on a line not radial to the wheel axis, substantially as set forth.

55. In a corn planter, the combination of the two seed boxes, a seed delivering mechanism for each box having a wheel adapted to be rotated continuously, a power transmitter actuated by the ground wheel and connecting both the said seeding wheels, and a power transmitter extending from one seeding box to the other and adapted to be reciprocated and to be thrown into and out of action, substantially as set forth.

56. In a corn planter, the combination of the two seed boxes, a seed delivering mechanism for each box having a wheel adapted to be rotated continuously, power transmitting devices actuated by one of the ground wheels and adapted to rotate one or both of the seeding wheels continuously, the power transmitting devices connecting the two aforesaid wheels, means for throwing the said power transmitting devices into and out of action, and a reciprocating power transmitting device extending from one seed delivering mechanism to the other, and adapted to be actuated independently of the ground wheels, substantially as set forth.

57. The combination with the frame, of the seed boxes adjustable toward and from each other, each box having a seeding mechanism, power transmitting devices extending from one seeding mechanism to the other, and adapted to be continuously rotated from the ground wheel, and to be adjustably connected to the seeding mechanism at different points, and a supplemental power transmitting mechanism extending from one seeding mechanism to the other and adapted to be intermittingly reciprocated, substantially as set forth.

58. The combination with the seeding mechanism, of the gear 36, adapted to continuously actuate the seeding mechanism, the shaft 35 for said gear mounted transverse to the machine in the vertical plane of the axis of the seeding mechanism, means for connecting said shaft to the ground wheel, and the reciprocating slide 64 mounted in planes other than that of said axis, substantially as set forth.

59. The combination with two seeding mechanisms adapted to receive seed plates rotating on vertical axes, a rotary shaft 35 extending from one seeding mechanism to the other, and a reciprocating bar, as at 67, adapted to actuate the said seed plates, and a wire actuated check row mechanism connected to said bar 67, substantially as set forth.

60. In a planter, the check row wire guide having in combination with an upward-swinging anti-friction roller, the downwardly and outwardly inclined stationary finger 78 immediately adjacent to said roller, whereby the wire is doffed downward and outward when the roller is elevated, substantially as set forth.

61. In a planter, a check row wire guide having an anti-friction roller supported on a bar pivoted above the roller, and a toggle lever lock for said arm, whereby the roller is held rigidly in position but can be elevated by opening the toggle lock, substantially as set forth.

62. In a planter, a check row mechanism having in combination, a horizontally arranged vibratable wire engaging lever 71 with a laterally extending fork arm, a stationary wire guide behind the fork lever, an upward swinging wire guiding anti-friction roller in front of the fork lever, and a downward and outward inclined wire guide immediately adjacent to the front roller and adapted to throw the wire by gravity and tension horizontally and downward from the fork lever, substantially as set forth.

63. In a corn planter the combination of the ground wheels, the frame thereon, the two seeding mechanisms, the runners vertically adjustable independent of each other, one for each seeding mechanism, the independent runner lifting levers, the covering wheels behind the runners and vertically adjustable therewith independently of each other, and the carriers for said wheels pivoted to vibrate laterally independently of each other, substantially as set forth.

64. In a corn planter, the combination with the seeding mechanism, the frame, the covering wheel, and the wheel carrier connected by a hinge to the frame, of the stop block 92 pivoted to the wheel carrier, the spring 95, the bar 93 engaging with said spring and adapted to engage with said stop block, and the bar 94 engaging with said spring in one direction and with the stop block 92 in the opposite direction, substantially as set forth.

65. In a planter, the combination with the frame, the seeding mechanism thereon, and the runners or furrow openers adjustable vertically independently of the seeding devices, of the covering wheels oscillating vertically and horizontally independently of each other, the yielding connection between the runners and covering wheels, and the lifting mechanism applied directly to the runners, substantially as set forth.

In testimony whereof I affix my signature in presence of two witnesses.

ROBERT H. AVERY.

Witnesses:
J. H. ELWARD,
A. BOWN.